July 5, 1955  H. ZIEBOLZ ET AL  2,712,414
ELECTRICAL ANALOGUE DEVICE
Filed Nov. 18, 1950  2 Sheets-Sheet 1
FIG. 1.
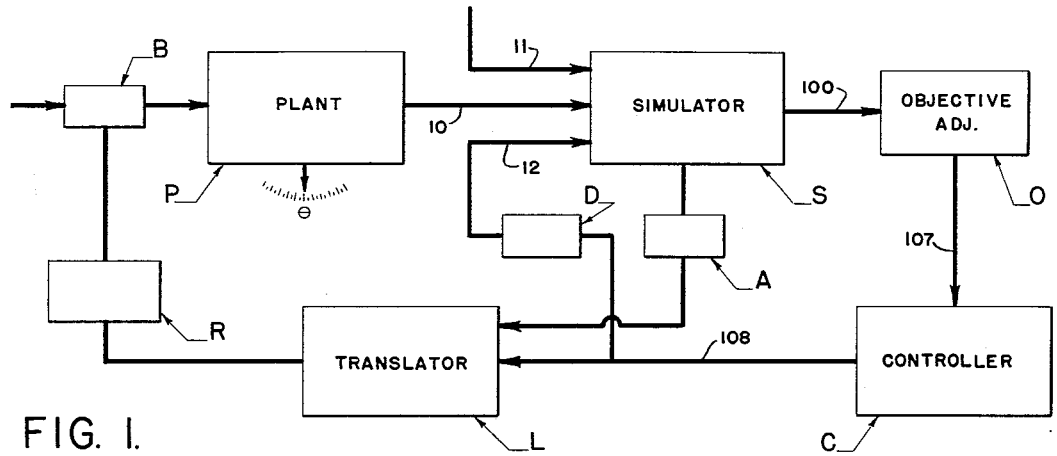
FIG. 3A.
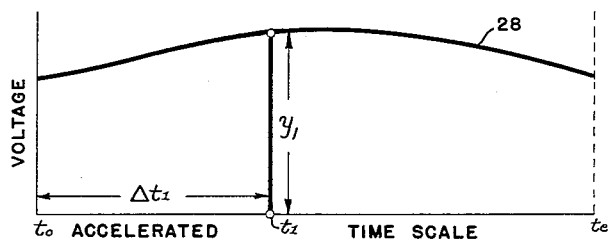
FIG. 3B.
FIG. 3C.
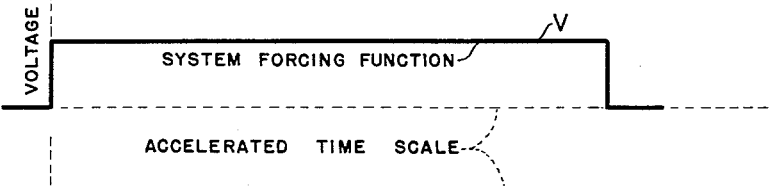
FIG. 3D.
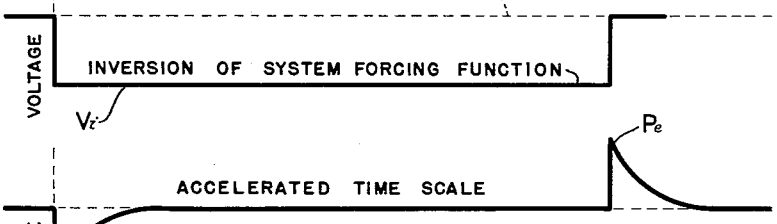
FIG. 3E.
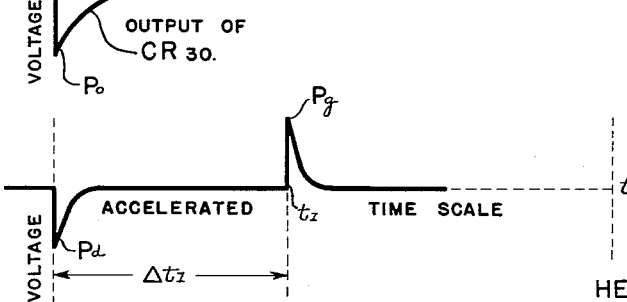
INVENTORS:
HERBERT ZIEBOLZ
MARK E. CAMPBELL
JOHN A. BARING
BY: Schroeder, Merriam, Hofgren & Brady
ATTORNEYS:

INVENTORS:
HERBERT ZIEBOLZ
MARK E. CAMPBELL
JOHN A. BARING
BY: Schroeder, Merriam, Hofgren & Brady
ATTORNEYS:

2,712,414

ELECTRICAL ANALOGUE DEVICE

Herbert Ziebolz, Chicago, Mark E. Campbell, Park Forest, and John A. Baring, Evanston, Ill., assignors to Askania Regulator Company, a corporation of Illinois Application November 13, 1950, Serial No. 195,444

16 Claims. (Cl. 235—61)

The invention relates generally to a method of and apparatus for controlling a plant.

The term "plant" is here used in the broad sense of indicating any operating unit or system the characteristics or attitudes of which change with time, be it a steam generating plant, a steel furnace, a ship, a rocket, a projectile from a gun emplacement, or any similar stationary or movable system or unit. In fact the term "plant" is intended to include mock-ups or small scale models for the full-scale plant, these being sometimes employed for giving training in the control of a plant, particularly where it is a mobile unit.

Currently the control or operation of a plant is largely a matter of the experience and judgment of the operator. While many instruments or devices are provided to aid the operator, these instruments or devices serve primarily merely to apprise the operator of current conditions, or to make adjustments which take into consideration only current conditions, and any adjustments looking toward future operation of the plant are made entirely on the judgment and experience of the operator.

Not only is the control dependent upon the judgment of an operator based on his familiarity with the performance characteristics of the plant, but the results of his judgment must await the lapse of time and not until that lapse of time is it known whether the operator's judgment was correct or erroneous. By way of crude example, the operator of a steam generating plant knows from experience that at a certain period of the day there is going to be a heavy demand for steam for a comparatively short period of time. Knowing that and knowing the characteristics of the steam generating plant and the fact that, of course, there is a lag in the time between the supply of more fuel and the generation of more steam, he attempts to anticipate the situation by adjusting the controls to supply additional fuel to the plant at such a time and in such quantities that the plant will be able to meet the demand without having the steam pressure fall below the desired value during the peak demand and without at the same time having a great overrunning of the plant when the demand again levels off. The operator, however, can only guess how the control should be adjusted so as to maintain the desired conditions during the peak demand and so as to arrive at the proper conditions when the demand has passed. Moreover, the operator cannot tell until the actual lapse of time and until the plant has responded to the change in control setting whether or not the setting was correct. This means, of course, that if the setting of the controls was not correct there is no way that the operator can go back in time and readjust the control settings. If he has overfired or underfired, there is no way in which he can go back and undo what he has done. All he can do is start with the conditions as they then exist and make another guess as to what adjustments of the control settings should be made to bring about desired conditions at some time in the future.

The invention contemplates the provision of an improved method of plant control whereby operation of the plant is simulated on an accelerated time scale thereby obtaining what can be termed a future derivative. This gives in the present time the value of some condition or attitude of the plant at some time in the future, assuming of course no change in the factors influencing the plant during the period of time over which the operation of the plant is being projected. As a result the operator has an immediate check on his judgment and appraisal.

While such a method is a vast improvement over a system or method in which the operator can do nothing but await the lapse of time, it still has shortcomings in that adjustment of the plant controls is a matter of the judgment and experience of the operator. In the example of the steam plant above given, the operator can, due to the extreme slowness in operation of the plant, make repeated further adjustments until the future value as indicated by the accelerated operation corresponds to the desired value. However, as the speed of operation or response of a plant increases the opportunity for such action by an operator is reduced to the vanishing point. In the case of a steam plant, the operator had hours in which to make repeated adjustments; in the case of a fighter plane the operator would have only a matter of minutes; and in the case of guided missiles or rockets the operator would have only a matter of seconds or possibly even fractions of seconds so that an error in judgment would mean failure to reach the target. It thus becomes essential for the method to operate successfully that provision be made to adjust the controls of the plant not only independently of the judgment of the operator, but also independently of any need for an elapsing of any material period of time to learn the effect of previous adjustments on the plant.

While the above is a great step forward, it still does not represent the optimum system for it does not make provision for changing conditions and factors nor does it assure the most expeditious mode of arriving at the desired result. Changing conditions or factors can, of course, be taken care of only by repeated recyclings of the apparatus in order that the changed conditions and factors may be incorporated and their influence compensated for. To illustrate the second mentioned shortcoming, it is conceivable that the controls of a plant could be so adjusted that at the end of a certain period of operation a certain condition or point would have been reached but that the plant in reaching that point would have gone through a devious rather than a direct path. Obviously, the optimum performance is obtained when the plant not only reaches a desired point or condition at a specified time in the future, but reaches it by a direct path.

It is an object of the invention, therefore, to provide a new and improved method of plant control whereby operation of the plant is simulated on an accelerated time scale, the value of one or more conditions at the end of a time increment of operation is determined and the future value so determined automatically translated for use and applied in the present operation of the plant on the normal time scale.

Another object is to provide a new and improved method of plant control wherein through simulated operation on an accelerated time scale a future value of some condition or attitude of the plant is obtained in the substantial present, the value so obtained compared with the desired value and a correction in control settings tending to eliminate the discrepancy between the acceleratedly-experienced and desired value computed, the correction in control settings made, and the effect of such change in control settings immediately ascertained by simulated operation on an accelerated time scale with the new settings incorporated in the simulated operation so as to provide a check on the correctness of the correction made.

Still another object is to provide a new and improved method of plant control wherein through simulated operation on an accelerated time scale a future value of some condition or attitude of the plant is obtained in the substantial present, the value so obtained compared with the desired value and a correction in control settings tending to eliminate the discrepancy between the acceleratedly-experienced and desired value computed, the correction in control settings made, the effect of such change in control settings immediately ascertained by simulated operation on an accelerated time scale with the new setting incorporated in the simulated operation so as to provide a check on the correctness of the correction made, and the foregoing steps rapidly repeated to minimize any discrepancy between the acceleratedly-ascertained value and the desired value.

Another object is to provide a new and improved apparatus for controlling a plant, having means for simulating operation of the plant on an accelerated time scale, means for picking up from the simulator the value of one or more conditions at some point of time in the program of operation, means for ascertaining the discrepancy between the acceleratedly-experienced value and the desired value and for computing the correction to be made, and means for applying the correction to the simulator and to the control of the plant.

A further object is to provide a new and improved apparatus for controlling a plant having accelerated-time-scale plant operation simulating means repeatedly performing a program of operation simulation, means for picking up from the simulator the value of one or more conditions at some point of time in the program of operation, means for ascertaining the discrepancy between the acceleratedly-experienced value and the desired value and for computing the correction to be made, means for applying the correction in the parameters of the accelerated operation to the simulator so that consideration thereof may be taken in the next program of operation of the simulator, and means for applying the computed correction in the control of the plant.

Still another object is to provide an apparatus for controlling a plant according to any of the previous objects in which the simulator is composed of electric or electronic circuits and circuit components.

Other objects and advantages will become apparent from the following detailed description taken in connection with the acocmpanying drawings, in which:

Fig. 1 is a diagrammatic illustration of a generic embodiment of the invention.

Figs. 3a to 3e are graph-like showings illustrating certain portions of the disclosure or the voltages of certain operation-forcing or triggering functions.

Figure 2:
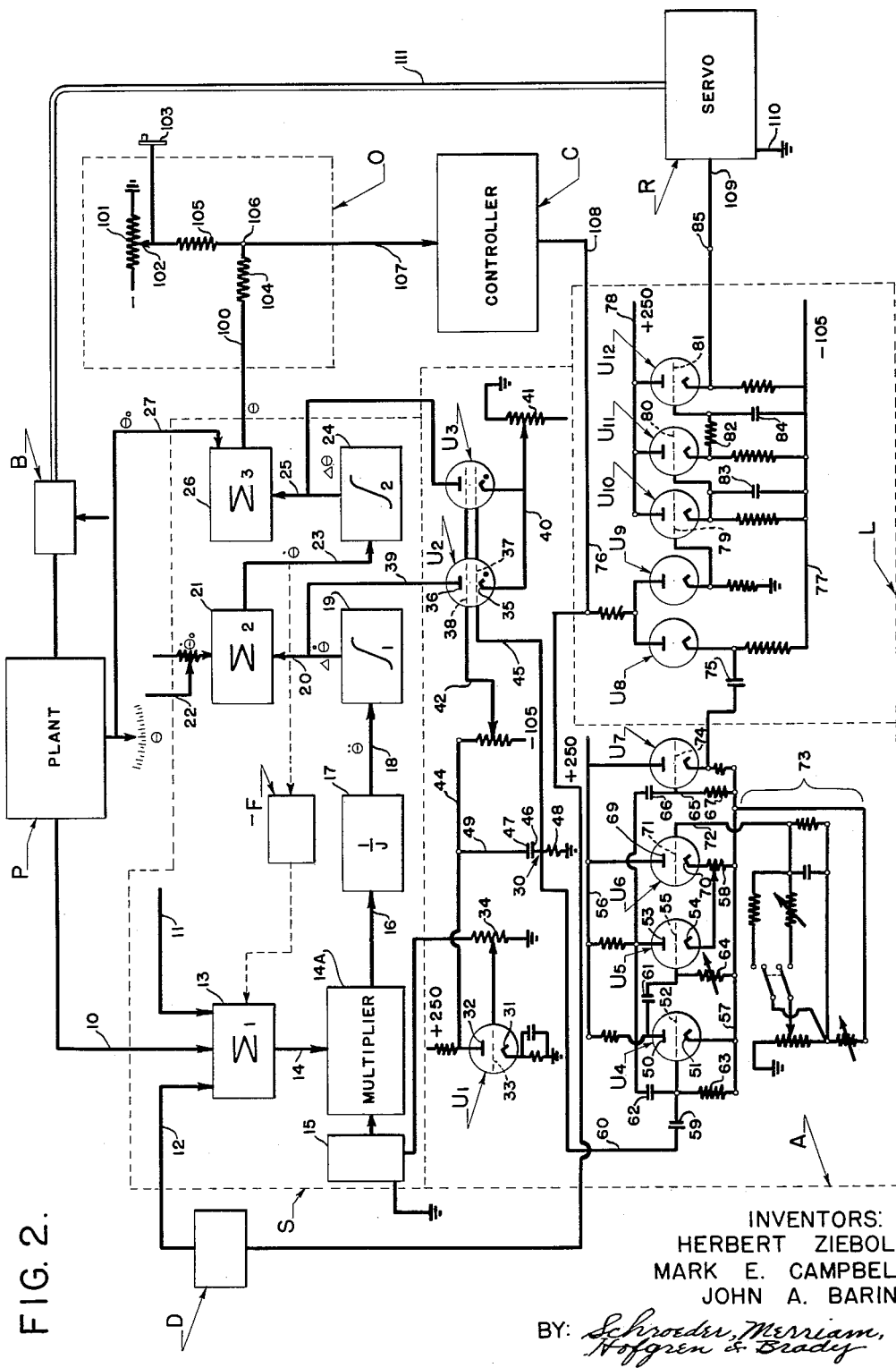
Fig. 2 is a circuit diagram partially in detail and partially in symbolic representation illustrating a particular embodiment of the invention.

While the invention is susceptible of various modifications, alternative constructions, and adaptations, varying with the speed of operation or response of the plant to be controlled, it will be hereinafter disclosed in a preferred embodiment. It is not intended, however, that the invention is to be limited thereby to the specific embodiment shown. On the contrary, it is intended to cover all modifications and alternative constructions falling within the spirit and scope of the invention as defined in the appended claims.

Referring first to Fig. 1 of the drawings, it will be apparent that generically the apparatus for practicing the invention comprises a plant P, an accelerated-time-scale simulator S which, as the name suggests, is a means for simulating the operation of the plant on a greatly accelerated time scale, objective means O, including a reference device adjustable to the desired value of attitude or characteristic to be attained at some point in a "program period," operative to ascertain the discrepancy between the desired value of attitude or characteristic and the acceleratedly-experienced value, means generally designated C, and hereinafter designated as controller for converting that discrepancy into a correction, means (for convenience called a translator), herein designated L, serving to translate the values derived from the simulator for use on the normal time scale, triggering means A for coordinating the operation of the simulator and translator and the intermediate means to obtain a proper feeding-in or sampling of the attitudes, factors or forces and a related taking-out of experienced values, and means B operating under the control of the translator L to make adjustment in the controls of the plant in accordance with the correction computed by the controller. In order to achieve the optimum operation above mentioned, the apparatus also includes an inner loop (simulator, objective adjustor, controller, and back to simulator) completing link including means D for converting the correction found necessary into values capable of being fed into the simulator S and corresponding to the adjustments being made at the controls of the plant. Also incorporated in the apparatus between the translator L and the means B is a servo R, the purpose of which will later be more fully pointed out.

As above indicated, this apparatus may take a variety of forms, depending somewhat upon the rate of operation or response of the plant. Thus it is contemplated and completely feasible where the apparatus is used in the control of a steam plant, a ship, or other device having a comparatively slow time scale of operation, that the apparatus can be largely mechanical. Where, however, the plant has a rapid time scale of operation, mechanical apparatus must give way to electronic apparatus because the latter is not only many, many times more rapid but also permits of more economical construction both as to cost and space consumed and permits of more ready change in adjustment to simulate different plants, conditions or characteristics.

It is believed that it has already been made clear that the plant P is any stationary or movable operating unit or system the characteristics or attitudes of which change with time. In some instances, the plant is the original unit or system, while in others it may be a mere mock-up or small-scale model. To facilitate understanding of the invention, let it be assumed, for purposes of this disclosure, that the plant P is a vehicle in space, or perhaps more accurately one supported in a fluid medium so as to have a high degree of freedom of movement. It is recognized that to describe completely a possible position in space six parameters are necessary, that is, three reference axes, and the rotation around these reference axes. For the sake of simplicity and since the basic equations and the mechanism for all of the six parameters are the same, the disclosure will be limited to one only of these parameters. Herein the particular attitude or condition that is to be controlled is the angular rotation of the vehicle about one of the reference axes and will hereinafter be referred to as the angle $\theta$. Influencing this angular position of the vehicle are its angular position and angular rate of change at the time the controls are adjusted, the torques generated by the control means of the vehicle, the torques set up by reactions to movement of the vehicle, possible torques due to acceleration, and so forth.

Turning now to the simulator S, this is a mechanism such as an analogue computer which, as the name suggests, simulates the plant or, more particularly, the dynamic operation or transients of the plant. To that end, the simulator must, first of all, be capable of functioning on the same equation as the plant and, secondly, must be adapted to be conditioned, that is, to have incorporated therein the attitudes of the plant as of some particular point in time. These attitudes, be they angular positions or torques, as in the case of the exemplary embodiment, or other values characteristic of plants of a different type, are derived from the plant P and are here represented as fed or incorporated into the simulator through a connection represented by the arrow 10. Also fed into or incorporated in the simulator may be other conditions, factors or forces which may be generated as a result of operation of the plant, or may be wholly external forces but which, during a given period of operation (hereinafter termed "program period"), will influence the plant. These are represented by the arrow 11. Also fed into the simulator and here represented by the arrow 12 are accelerated-time-scale values of the correction to be made in the controls of the plant to eliminate the discrepancy between the acceleratedly-experienced value and the desired value. This will be described in greater particularity hereinafter.

Usually a mathematical formula which describes the dynamic behavior of a body involves integration, multiplication, and so forth, and thus the simulator S is composed of a plurality of summarizers, integrators and multiplicators, the specific number or arrangement being dependent upon the plant operation to be simulated. These summarizers, integrators, etc., are not per se new but can be purchased on the open market or can be constructed by following known principles. These units have, therefore, not been disclosed in detail but have been illustrated diagrammatically by the well known practice of employing a rectangular block and a symbol commonly used to designate the function performed. As already stated, it is basically not material whether the apparatus including the simulator be mechanical or electrical so long as the apparatus is capable of operating on a time scale which is accelerated relative to the time scale of operation of the plant. For obvious reasons, however, the units of the simulator S as well as all of the parts of the apparatus are composed of electrical elements connected in electronic circuits or circuit components.

It is believed well at this time to define certain terms or phrases. "Program period" has already been partially defined as a given period of operation during which the plant is subjected to certain factors or forces. More particularly it designates a period of operation of arbitrarily chosen length during which continuous future operation of the plant is represented by the simulator and the corresponding period of operation of the plant. Accordingly, the "program period" may and does have two time scales, namely, the normal time scale of operation of the plant and the accelerated time scale of the simulator. The "program period" may represent a very small interval of time, or it may represent a period of substantial length, the length being in large measure indicated by the period of time for which the operation of a plant can be simulated with a reasonable degree of accuracy. Usually, therefore, the "program period" is a comparatively short period because of the difficulty and impossibility of setting up a suitable equation expressing the operation of the plant. The letter T with its prefixes, suffixes or exponents represents time, increments of time, or points of time on the normal scale, that is, the time scale of operation of the plant. Since this time scale of operation must, if the apparatus is to be of any value, be slower than the time scale of operation of the simulator and associated parts, it will hereinafter also be referred to as the "slow time scale." t correspondingly represents time on the simulated, accelerated or fast time scale of the simulator and associated apparatus. "Acceleratedly-experienced" means, as the words clearly indicate, a value actually experienced by accelerated operation of the simulator and associated apparatus.

It is believed understood, but as a precautionary measure mentioned, that the equation set up to represent the operation of the plant is an approximation only and that in setting up the equation certain assumptions are made as is the practice in mathematics. Since the simulator can function no more accurately than the equation set up, it is to be understood that the terms "simulate" and "simulator" are employed in that sense and meaning.

Having chosen angular rotation or angular position of a vehicle as the particular attitude or condition to be controlled, the attitudes, forces and factors are those related to that attitude, and the simulator herein disclosed by way of example will have to be correspondingly composed to deal with torque, angular position, acceleration, and so forth. Were some other attitude or condition or a different type of plant chosen, the factors would be different. The chosen attitude will, however, serve for purposes of disclosure and to make the invention more readily understandable. In accordance with the fundamental Newton equation, the angular acceleration of a body in space $$\frac{d^2\theta}{dt^2}$$

is proportional to the sum of all torques divided by the moment of inertia (J) of the body. This is stated mathematically $$\frac{d^2\theta}{dt^2} = \frac{\text{torque}}{J}$$

Accordingly, the torques, in proper ratio of magnitudes and herein as electrical signals, are fed (see Fig. 2) into a first summarizer 13 with the output of the summarizer 13 fed through a connection represented at 14 to a multiplier 14a which modulates the output of a square wave generator 15. From the multipler these signals, having voltage as the parameter, are fed by way of a conductor 16 to a divider 17 which functions to divide the torque by the moment of inertia of the vehicle to give the second derivative $\ddot{\theta}$, namely, acceleration $$\frac{d^2\theta}{dt^2}$$

as above pointed out. The output of the divider 17 is by a connection 18 fed to a first integrator 19 which by the process of integration gives the first derivative or rate of change in angular position, namely, $$\frac{d\theta}{dt}$$

From the integrator 19 a connection 20 transmits the result to a second summarizer 21.

Leading from the summarizer 21 back to the summarizer 13 is a connection (—F) so that there may be duly taken into consideration the torques produced by the damping action of the medium in which the vehicle is suspended. Such damping action is usually proportional to the rate of change $$\frac{d\theta}{dt}$$

and this damping factor is commonly designated by the letter F, hence its use as a reference character for the connection described. The negative sign is employed to indicate that damping usually opposes the other torques.

Hereinafter "T" will be employed to designate points or increments of time on the normal time scale, while "t" will designate corresponding points or increments on the accelerated time scale. "T₀" and "t₀" will represent commencement of the "program period" on their respective time scales and, since the accelerated operation must for proper functioning of the system, commence simultaneously with the commencement of the "program period" on the normal time scale $T_0$ and $t_0$ are "coincident." "$T_e$" and "$t_e$" represent the end of a "program period," and "$T_1$" and "$t_1$" represent a particular point in the "program period" at which the value of an attitude or characteristic is to be determined. Since the end results of the formulae here dealth with are $\theta$ and $\Delta\theta$, T and t are normally interchangeable.

To the summarizer 21 there is also added the rate of angular movement $\dot{\theta}_0$ of the vehicle at the time the "program" is initiated, that is, at the time $T_0$. The value $\dot{\theta}_0$ is introduced because the change in angular position $\Delta\theta$ in the interval $\Delta t_1$ (see Figs. 3a–3e) is $$\int_{t_0}^{t_1}\left[\int\frac{d^2\theta}{dt^2}dt\right]dt + \int_{t_0}^{t_1}\left(\frac{d\theta}{dt}\right)_0 dt$$

This factor is here represented by the arrow 22 and is obtained directly from the plant. The summarized rate of change inputs of a summarizer 21 are by a connection 23 fed to a second integrator 24 whose output is change in angular position, that is, $\Delta\theta$. Depending on the nature of the terminal result desired, the integrator 24 may be the last unit of the simulator. If, however, the result desired is the actual value $\theta$, the output of the integrator 24 may, as here, be fed by a connection 25 into a third summarizer 26. Also fed into this summarizer is the angular position $\theta_0$ of the vehicle at the start of the "program period," that is, at the time $T_0$. It is represented in Fig. 2 by an arrow 27 and is added because the final position is $$\theta_0 + \int_{t_0}^{t_1}\left[\int\frac{d^2\theta}{dt^2}dt\right]dt + \int_{t_0}^{t_1}\left(\frac{d\theta}{dt}\right)_0 dt$$

The output of this summarizer 26 is then the result sought, namely, the actual value of $\theta$ at the time $t_1$.

Mention is made above and will be made in the future of the introduction of some value such, for example, as $\dot{\theta}$ at some particular time, such as the time $T_0$. This implies that the value at that particular instant is utilized and not changed until initiation of a subsequent "program period." This is a theoretically possible and convenient treatment but actually as the system is set up the current and possibly changing values are fed to the simulator and taken into account. This is a step in the right direction for it results in more accurate predictions. However, normally the rate of operation of the simulator is so much faster than that of the plant that the changes in values are for the most part negligible.

It will be appreciated, of course, that for different attitudes or for the same attitude of a different plant, the units, that is, integrators, summarizers, etc. that go to make up the simulator, will vary as to number or arrangement or both. Whatever the arrangement may be, however, and whatever the attitude to be observed, the simulator can be made to produce a voltage varying in time as the attitude of the real plant varies. This voltage may be represented by the trace 28 in Fig. 3a wherein the abscissa axis represents time on an accelerated time scale and the ordinate axis represents voltage.

As has already been stated, the parameter arbitrarily chosen to express the attitudes, factors and forces of and acting on the vehicle is voltage. This voltage is herein caused to have a square wave form when fed into the multiplier 14a, as represented at V in an exaggerated manner in Fig. 3b. Application of the voltage initiates operation of the units of the simulator and the end of the square wave tends to terminate operation of the simulator. The duration of the square wave V thus determines the duration of the "program period" while the amplitude of the square wave is a measure of the magnitude of the values being fed into the simulator at the divider 17. The square wave thus exercises basic control over the operation of the simulator and, as will hereinafter be made known, also over the translator, and will hereinafter be referred to as the system-forcing function.

Exercising immediate control is the triggering means A, which, as above stated, coordinates the operation of the simulator and the translator to obtain a proper feeding-in or sampling of the attitudes, factors or forces and a related taking-out of experienced values. In order that residual voltages or stray voltages may not cause operation, particularly of the integrators, after the square wave V has returned to zero, the triggering means A functions, among other ways, to remove any residual values, herein voltages, from the output of the integrators 19 and 24. The triggering means A comprises a first grid-controlled vacuum tube U1 which functions as a wave inverter, a resistor-condenser differentiating unit 30, and a gas-filled tube for each integrator, herein tubes U2 and U3. The cathode 31 of the tube U1 is connected to ground, the plate 32 is connected to a positive voltage source of comparatively high value, on the order, for example, of 250-volts, and the grid 33 is connected to a voltage divider 34 one end of which is connected to ground, the other end of which is through a lead 34a connected to the square wave generator 15 so that the square wave V is impressed upon it. As a result, the tube U1 will function in well known manner to produce an inverted square wave Vi coincident with the square wave V.

The thyratrons U2 and U3 are connected in parallel and it will be appreciated that their number could be increased were there additional integrators or other units in the simulator whose outputs were to be restored to zero. Inasmuch as the thyratrons are in parallel and operate the same, the connections and operation of but one of the tubes will be described. Taking tube U2, it has a cathode 35, a plate 36, a control grid 37 and a shield grid 38. The plate 36 is by a lead 39 connected to the output of integrator 19, that is, to the connection 20, and the cathode 35 is by a lead 40 connected to a negative potential source 41. Herein the cathode is given a potential of about a minus 10-volts which approximates the voltage drop through the tube when the tube is broken down. In this way, the plate 36 and hence the output of the integrator 19 will be at approximately zero or ground potential when the tube U2 is broken down. The shield grid 38 is by a lead 42 connected to a second voltage divider 43, one end of which is also connected to a negative potential of about 105-volts while the other end is by a lead 44 connected to the plate 32 of the tube U1. The control grid 37 is by a lead 45 connected to the juncture point 46 between a condenser 47 and a resistor 48 composing the resistor-condenser differentiating unit 30. The remaining side of the condenser 47 is by a lead 49 connected to the lead 44, while the resistor 48 is connected to ground.

The operation of the signal pulse-forming portion, just described, of the triggering means A is as follows: With the sharp rise in voltage of the square wave V, there is a corresponding voltage impressed across the divider 34 thereby biasing the grid 33 sharply positive and increasing the flow of current through the tube U1 with a corresponding drop in plate voltage as shown in Fig. 3c. This reduction in plate voltage is transmitted to the R-C differentiating unit 30 and thus produces at the juncture point 46 a sharp negative pulse $P_0$ as shown in Fig. 3d, this pulse of course being coincident with the commencement of the square wave V and hence with the time $t_0$. This negative pulse is by lead 45 impressed on the control grid 37 of the thyratron U2 and extinguishes the tube. Grid 38 is also made negative and thus aids in arresting operation of the tube. With the tube U2 no longer conductive, the output of the integrator 19 is no longer held at zero but is fed to the summarizer 21.

At the end of the "program period," that is, at the time $t_e$, the square wave V drops suddenly to zero. This has the reverse effect on the tube U1 and on the R-C differentiating unit 30 from that just described, with the result that there is a positive pulse $P_e$. This is now applied to the control grid 37 of the tube U2. Simultaneously the voltage of the plate 32 rises sharply, thereby causing lead 42 to take from the voltage divider 43 a positive rather than a negative voltage which is impressed on the shield grid 38. With both grids now positive, the tube U2 breaks down and commences to fire. While the positive pulse $P_e$ is merely a pulse, the tube continues to fire until the next negative pulse despite the disappearance of the positive pulse because of the character of the tube and the fact that the shield grid 38 remains positive until the commencement of the next square wave V. With the tube U2 broken down, its plate 36 will, for the reasons previously described, be at substantially zero potential and likewise the connection 20 leading from integrator 19 to summarizer 21 will be at zero potential.

It will be appreciated that the "program period" on the accelerated time scale and utilizing electronic circuit components can be and herein is in the order of milliseconds. Thus, while the simulator gives the value $\theta$, it is of no utility until it can be captured and usually until it can be translated to a slower or normal time scale of the plant to be represented. Moreover, since it is not always the value of the attitude at the end of the "program period" that is desired, an apparatus in order to be satisfactory must be capable of picking off the voltage value at any point in the "program period," for example, at the point $(t_1)$ which occurs an increment of $\Delta t_1$ after $(t_0)$.

In a basic system employing acceleratedly-simulated operation to give an operator of a plant present knowledge of the future value of some condition or attitude of the plant, the value derived from the simulator, for example the value $\theta$, might be immediately and directly fed to the translator L to be there stored and translated to a slower time scale so as to be utilizable for control purposes on the normal or slow time scale. The value thus obtained can by the operator of the plant be compared with the desired value and the difference, if any, utilized as a guide for the further adjustments of the controls in an effort to reach the desired value. There is thus completed a loop from the plant P back to the plant, with the operator constituting a link or element in the loop. For purposes that will presently become apparent, this loop will at times be referred to as the external loop. As above stated, however, this still requires and is dependent upon the exercise of judgment by the operator. In the refined concept of this invention the operator and his judgment are replaced by automatically operating devices. Thus the loop from the plant back to the controls of the plant is again completed but with the operator replaced by a more accurately and more swiftly functioning means. Accordingly, means are provided herein for ascertaining the discrepancy between the acceleratedly-experienced value and the desired value and for converting that discrepancy into a required correction of the setting of the controls.

To this end, the output of the simulator S, more particularly of the summarizer 26, is fed to the objective means O, as represented by the line 100. The objective means O may take a variety of forms so long as it is capable of indicating or computing the error or discrepancy between the acceleratedly-experienced value and the desired value. Since the output of summarizer 26 is a voltage, the reference device of objective means O may take the simple form of a potentiometer 101 having a movable contact 102 adjustable by manual means 103, to vary the voltage taken off. It will be appreciated, of course, that in this particular instance the voltage taken off from the potentiometer 101 represents the desired value of $\theta$. The summarizer 26 through the lead 100 and a resistance 104, and contact 102 through a resistance 105, are connected to a common point 106 so that the combined voltages will represent the difference or error between the desired value of $\theta$ and the acceleratedly-experienced value. This error or discrepancy is then through lead 107 fed to the controller C.

Controller C receives this computed error or discrepancy and converts the same into a value representing the adjustment to be made in the setting of the controls of the plant to bring about such operation as will cause the plant to have the desired value at a particular time in the "program period" when that time is reached on the normal or slow time scale. Such a controller per se, as in the case of the simulator, forms no specific part of the invention. The details of the controller are, therefore, not disclosed, such controllers being available on the open market or readily capable of construction by following well known principles.

The correction calculated by the controller C is through a lead 108 fed to the translator L. Even though the translator now receives a calculated correction rather than the value $\theta$, it must nevertheless function to pick off a value at a particular time in the "program period." It is therefore keyed to and triggered by the system-forcing function of the simulator, more particularly, the negative pulse $P_0$ of the differentiating unit 30. Forming a portion of the triggering means and responsive to the system-forcing function is a gate pulse generating means.

The gate pulse generating means is composed of what is commonly referred to as a multi-vibrator and comprises a pair of grid controlled tubes U4 and U5, the tube U4 having a plate 50, a cathode 51, and grid 52. Tube U5 similarly has a plate 53, a cathode 54 and a grid 55. Both plates are connected to a comparatively high positive potential represented at 56, and the cathode 51 is connected to a negative potential something less than half the value of the positive potential which is here represented at 57. Cathode 54 is connected to the negative potential 57 through a voltage divider 58 which will presently be described in greater detail. The grid 52 is through a condenser 59 and a lead 60 connected to the juncture point 46 of the differentiating means 30, while grid 55 is through a condenser 61 connected to the plate 50 of the tube U4. The grid 52 is in turn also connected to the plate 53 through a condenser 62. Resistances 63 and 64 are connected, respectively, between the grids 52 and 55 and the negative potential 57 with resistance 64 being variable. Completing the principal portion of the gate pulse generating means is an R-C differentiating means, generally designated 65, composed of a condenser 66, one plate of which is connected to the plate 53, and a resistor 67 connected at one end to the remaining plate of the condenser and at the other end to the negative potential 57.

The tube U4 is biased so as to be normally conductive. Thus when the negative pulse $P_0$ is applied to the grid 52 the tube becomes less conductive with a corresponding increase in the plate voltage. This increase is through condenser 61 transmitted to grid 55 of the tube U5 causing that tube which is normally nonconductive to become conductive. The resulting drop in plate voltage of the tube U5 is then through condenser 62 applied to grid 52 thereby driving the tube U4 further toward cut-off. This in turn further affects tube U5, as above described, with the result that there is a very decided drop in the plate voltage of the tube U5 at the time $t_0$. This drop applied to the differentiating means 65 produces a sharp negative pulse $P_d$ (see Fig. 3e).

As the positive charge on the grid 55 leaks off through the resistance 64, the grid returns to its cut-off value. When it reaches cut-off value a sudden return of the circuit just described to its original state occurs through the inverse of the process above set forth. This means a sudden rise in voltage and when differentiated by the R-C means 65 a positive pulse is obtained. This pulse is represented as $P_g$ in Fig. 3e and is herein termed the gate pulse because it determines the time of pick-off of the voltage value from the simulator and triggers the operation of the sampling means. This pulse occurs at the time $t_1$ in the "program period," that is, an increment of time $\Delta t_1$ after $t_0$. The time delay between pulse $P_d$ and $P_g$ is determined by the time constant of the condenser 61 and the resistor 64 and the bias on the tube U5.

In order to vary the time of occurrence of the gate pulse $P_g$, tube U6 is provided and is so connected in circuit as to vary the bias of tube U5 which, as above stated, is one of the factors influencing the return of the tube U5 to cut-off, nonconducting condition. The plate 69 of the tube U6 is connected to the positive potential 56 while cathode 70 is connected to the negative potential 57 through voltage divider 58 to which the cathode 54 of the tube U5 is connected. The grid 71 of the tube U6 is by a lead 72 connected to means, generally designated 73, of well known construction and operating in well known manner to vary the bias of the tube U6 thereby in turn varying the flow of current through the divider 58 and hence the voltage on the cathode 54.

The output of this gate pulse generating means is preferably amplified by the tube U7 whose grid 74 is connected to the junction point between the components of the differentiating means 65. From the tube U7 the gate pulse $P_g$ is through a condenser 75 applied to the sampling circuit to trigger the operation thereof.

The sampling or pick-off means comprises a pair of tubes U8 and U9 the plates of which are connected by a common lead to the output of the simulator which in the preferred embodiment herein disclosed is transformed to a correction as already described. The cathode of the tube U8 is connected to a negative potential represented at 77 and is also connected, as already stated, to the cathode of the tube U7 through condenser 75. The cathode of the tube U9 is connected to ground. The tube U8 is normally so biased that it conducts enough current to bring the plate of tube U9 negative relative to its cathode thereby cutting off operation of tube U9. When the positive gate pulse $P_g$ is impressed on the cathode of tube U8, its potential is raised above that of its plate and thus tube U8 ceases to conduct for the duration of the pulse. This then raises the potential of the plate of tube U9 causing it to conduct for that brief interval and to pick off the value determined by the simulator at the time $t_1$ as converted by the objective means O and the controller C into a computed correction in adjustment of the plant controls.

This momentary value picked up by tube U9 from the controller C is transmitted to the storing means which comprises three tubes U10, U11 and U12, the plates of which are all connected to a common positive potential indicated at 78 and the cathodes of which are all connected to the negative potential 77. The grid 79 of the tube U10 is connected to the cathode of tube U9 while the grid 80 of the tube U11 is connected to the cathode of tube U10, and the grid 81 of the tube U12 is connected through a resistance 82 to the cathode of the tube U11. The grid 80 of tube U11 and the cathode of tube U10 are additionally connected to the negative potential 77 through a condenser 83, and the grid 81 of tube U12 is similarly connected through a condenser 84. With the circuit arranged as described, there is stored on the condenser 83 a charge which constitutes a measure of the correction of adjustment of the controls for the plant. Tube U10 then in turn controls tube U11 to store on condenser 84 a charge proportional to the correction in control adjustments that is to be made. The combination of condensers 83 and 84 and resistor 82 in conjunction with the operation of tubes U10 and U11 serves to filter out undesirable high frequency components introduced by the nature of the operation of tube U9. The voltage communicated to the grid 81 of tube U12 is, therefore, a smoothly varying voltage which at all times is a measure of the adjustment of the controls that is to be made. Inasmuch as the operation is repeated continuously and at milli-second intervals, the value at the time $t_1$ appears at the terminal 85 not as a very brief value, but as a continuous value available to effect an adjustment of the plant controls on their natural, slow time scale of operation. This correction value may then by the means B be applied to the controls of the plant.

It will be apparent from the foregoing that the apparatus thus far described would function to obtain in the substantial present some future value of a particular condition or attitude of the plant, automatically ascertain the discrepancy between the acceleratedly-experienced value and the desired value, convert the discrepancy into a correction, make the correction available on a slow time scale, and effect adjustment of the controls of the plant in accordance with the correction. This operation would be performed not once but many times in a "program period" on the real time scale, depending upon the ratio of the accelerated time scale to the normal or slow time scale. With each repetition of the cycle of operation, new values of conditions, attitudes, factors and forces of or acting on the plant are, of course, utilized.

As highly advantageous as is such a system, its efficiency is still something short of the optimum because, as pointed out, though the plant is caused to have the desired value of a condition at some particular time, it may arrive at that value through a devious rather than a direct path.

By refinements and additions to the apparatus it is rendered capable of functioning in such a manner that this optimum in operation is approached. These refinements or additions herein involve means incorporated in both the portions of the apparatus involving the normal as well as the accelerated or simulated operation and signals. More particularly, they involve the position servo mechanism R and the completing link 12, primarily the means D closing or completing the "inner loop," in order that the acceleratedly-experienced values may also be utilized on an accelerated time scale. The servo R is by a lead 109 connected to the terminal 85 and is by a lead 110 connected to ground. The connection between the servo and the means B is mechanical and is represented by the line 111. This servo mechanism is so arranged that the velocity of operation of the mechanical connection 111 is proportional to the difference between the then status of the connection and that called for by the voltage on the terminal 85, with the servo being by adjustment made to assume a rate of operation that would be required to bring the controls of the plant to the calculated ideal position at the future time $T_1$.

Means D functions first of all to convert the values derived from the controller to appropriate parameters suitable for being fed back into the simulator and, secondly, to cause those values to be fed back to the simulator in a manner and at a rate corresponding to the servo mechanism R. It is to be noted in this connection that the values fed back to the simulator are derived not from the translator L nor from the terminal 85, but directly from the controller C so that the constantly changing values in a "program period" and not merely the one value $t_1$ are fed back to the simulator. The result is that the "inner loop" composed of the simulator, objective means O, and controller C constitutes, in effect, a pilot apparatus which feels its way toward the desired value of the condition at the specified time. Inasmuch as this "inner loop" functions on the accelerated time scale, it is constantly and for every small fraction of time of operation of the plant detecting the trends of the plant and immediately correcting those trends, thereby preventing operation of the plant on a circuitous path and causing it to take a more direct path. In effect, the plant P and associated apparatus is caused to follow the lead of the "inner loop" or pilot apparatus.

We claim as our invention:

1. An apparatus for use in the control of a plant equipped with adjustable controls comprising, in combination, accelerated time scale plant operation simulating means producing a transient of at least one attitude of the plant over a program period extending into the future including a summarizer and other computing devices, triggering means operatively associated with said simulating means to obtain therefrom the value of the attitude at a particular time in the program period, a first circuit operatively associated with said last named means and connected back to the summarizer of said accelerated time scale plant operation simulating means, a second circuit operatively associated with said last named means and including a device for translating the transient value received into a corresponding value on a slower time scale, and means connected to the plant and to said translating device for transmitting the slow time scale values to the plant.

2. An apparatus for use in the control of a plant equipped with adjustable controls comprising, in combination, accelerated time scale plant operation simulating means producing a transient of at least one attude of the plant over a program period extending into the future, means operatively associated with said simulating means to obtain therefrom the value of the attitude at a particular time in the program period, a reference device adjustable to a value desired to be obtained, and means operatively associated with said reference device and said last named means for ascertaining the discrepancy between the acceleratedly-experienced value of the attitude and the desired value for use in adjusting the controls of the plant.

3. An apparatus for use in the control of a plant equipped with adjustable controls comprising, in combination, accelerated time scale plant operation simulating means producing a transient of at least one attitude of the plant over a program period extending into the future, a reference device adjustable to a value of said one attitude desired to be obtained, means operatively associated with said reference device and said simulating means ascertaining the discrepancy between the value of the attitude at a particular time in the program period experienced by said simulating means and the desired value, and means operatively associated with said last named means computing the change in control settings to be made to minimize the discrepancy.

4. An apparatus for use in the control of a plant equipped with adjustable controls comprising, in combination, accelerated time scale plant operation simulating means producing a transient of at least one attitude of the plant over a program period extending into the future, a reference device adjustable to a value of said one attitude desired to be obtained, means operatively associated with said reference device and said simulating means ascertaining the discrepancy between the value of the attitude at a particular time in the program period experienced by said simulating means and the desired value, means operatively associated with said last named means computing the change in control settings to be made to minimize the discrepancy, and means for changing the control settings of the plant accordingly.

5. An apparatus for use in the control of a plant equipped with adjustable controls comprising, in combination, accelerated time scale plant operation simulating means producing a transient of at least one attitude of the plant over a program period extending into the future, a reference device adjustable to a value of said one attitude desired to be obtained, means operatively associated with said reference device and said simulating means ascertaining the discrepancy between the value of the attitude at a particular time in the program period experienced by said simulating means and the desired value, means operatively associated with last named means computing the change in control settings to be made to minimize the discrepancy, means for translating the computed change in control settings to the time scale of operation of the plant, and means for automatically changing the control settings in accordance with the computed change.

6. An apparatus for use in the control of a plant equipped with adjustable controls comprising, in combination, accelerated time scale plant operation simulating means producing a transient of at least one attitude of the plant over a program period extending into the future, a reference device adjustable to a value of said one attitude desired to be obtained, means operatively associated with said reference device and said simulating means ascertaining the discrepancy between the value of the attitude at a particular time in the program period experienced by said simulating means and the desired value, means operatively associated with last named means computing the change in control settings to be made to minimize the discrepancy, and means for directly incorporating the called for change in control settings in said simulating means.

7. An apparatus for use in the control of a plant equipped with adjustable controls comprising, in combination, accelerated time scale plant operation simulating means producing a transient of at least one attitude of the plant over a program period extending into the future, a reference device adjustable to a value of said one attitude desired to be obtained, means operatively associated with said reference device and said simulating means ascertaining the discrepancy between the value of the attitude at a particular time in the program period experienced by said simulating means and the desired value, means operatively associated with said last named means computing the change in control settings to be made to minimize the discrepancy, means for directly incorporating the called for change in control settings in said simulating means, means for translating the computed change in control settings to the time scale of operation of the plant, and means for automatically changing the control settings in accordance with the computed change.

8. An apparatus for use in the control of a plant equipped with adjustable controls comprising, in combination, means adapted when subjected to the same factors and conditions to which the plant is subjected to simulate operation of the plant during a given program period on an accelerated time scale in respect of at least one attitude of the plant, means operatively associated with said simulating means to obtain therefrom the value of the attitude at some predetermined point of time during the program period, a reference device adjustable to a value of said one attitude desired to be obtained, means operatively associated with said reference device and said last named means ascertaining the discrepancy between the acceleratedly-experienced value of the attitude and the desired value thereof at the predetermined point of time in the program period, means translating the discrepancy into adjustment of the controls of the plant in a manner calculated to minimize the discrepancy and effecting such adjustment to complete a loop from the plant back to the plant, and means for repeating the simulated operation with the then current factors at periodic intervals.

9. An apparatus for use in the control of a plant equipped with adjustable controls comprising, in combination, means adapted when subjected to the same factors and conditions to which the plant is subjected to simulate operation of the plant during a given program period on an accelerated time scale in respect of at least one attitude of the plant, means operatively associated with said simulating means to obtain therefrom the value of the attitude at some predetermined point of time during the program period, a reference device adjustable to a value of said one attitude desired to be obtained, means operatively associated with said reference device and said last named means ascertaining the discrepancy between the acceleratedly-experienced value of the attitude and the desired value thereof at the predetermined point of time in the program period, means translating the discrepancy into adjustment of the controls of the plant in a manner calculated to minimize the discrepancy and effecting such adjustment to complete a loop from the plant back to the plant, and means for repeating the simulated operation with the then current factors at periodic intervals which are small in actual time compared with the actual time of a program period on the time scale of the plant.

10. An apparatus for use in the control of a plant equipped with adjustable controls comprising, in combination, means adapted when subjected to the same factors and conditions to which the plant is subjected to simulate operation of the plant during a given program period on an accelerated time scale in respect of at least one attitude of the plant, means operatively associated with said simulating means to obtain therefrom the value of the attitude at some predetermined point of time during the program period, a reference device adjustable to a value of said one attitude desired to be obtained, means operatively associated with said reference device and said last named means ascertaining the discrepancy between the acceleratedly-experienced value of the attitude and the desired value thereof at the predetermined point of time in the program period, means translating said discrepancy into adjustment of the controls of the plant calculated to minimize said discrepancy, means for directly incorporating the effect of such change in control settings in said simulating means, and means for repeating the simulated operation to learn the effect of such calculated change in control settings without awaiting the slower response of the plant to a change in the control settings.

11. An apparatus for use in the control of a plant operating on a certain time scale and equipped with adjustable controls comprising, in combination, an analogue adapted when subjected to the same factors and conditions to which the plant is subjected to simulate operation of the plant during a given program period on an accelerated time scale in respect of at least one attitude of the plant, means operatively associated with said analogue to obtain therefrom the value of the attitude at some predetermined point of time during the program period, a reference device adjustable to a value of said one attitude desired to be obtained, means operatively associated with said reference device and said last named means ascertaining the discrepancy between the acceleratedly-experienced value of the attitude and the desired value thereof at the predetermined point of time in the program period, means producing on the accelerated time scale a signal indicative of the change in setting of the adjustable controls of the plant calculated to minimize said discrepancy, means for incorporating in said analogue, utilizing said signal directly, factors equivalent to those that would in time be obtained from the plant were a corresponding adjustment of settings of the controls to be made, means for translating said signal to the time scale of the plant, means responsive to the translated signal to effect the called for change in settings of the controls, and means for repeating the simulated operation at periodic intervals.

12. An apparatus for use in the control of a plant operating on a normal time scale and equipped with adjustable controls comprising, in combination, an analogue adapted when subjected to the same factors and conditions to which the plant is subjected to simulate operation of the plant during a given program period on an accelerated time scale in respect of at least one attitude of the plant, means operatively associated with said analogue to obtain therefrom the value of the attitude at some predetermined point of time during the program period, a reference device adjustable to a value of said one attitude desired to be obtained, means operatively associated with said reference device and said last named means ascertaining the discrepancy between the acceleratedly-experienced value of the attitude and the desired value thereof at the predetermined point of time in the program period, means producing on the accelerated time scale a signal indicative of the change in setting of the adjustable controls of the plant calculated to minimize said discrepancy, means for incorporating in said analogue, utilizing said signal directly, factors equivalent to those that would in time be obtained from the plant were a corresponding adjustment of settings of the controls to be made, means for translating said signal to the time scale of the plant, means responsive to the translated signal to effect the called for change in settings of the controls, and means for repeating the simulated operation at periodic intervals of a length such that a plurality of accelerated program periods occur in the interval between commencement of a program period and said predetermined point of time in the program period on the normal time scale.

13. An apparatus for use in the control of a plant operating on a normal time scale and equipped with adjustable controls comprising, in combination, a simulator of the dynamic operation of the plant, in respect of at least one attitude, adapted to have fed into it and be subject to the same values of current attitudes, factors and forces as the plant and functioning when so conditioned to simulate operation of the plant during a given program period, said simulator operating on a time scale accelerated with respect to the time scale of operation of the plant so as actually to experience, during the accelerated program period, the value of an observed attitude at a future point in time, means operable to pick-off from said simulator the experienced value of an attitude being observed at a point in the accelerated program period corresponding to said point of time in the future, means coordinating the operation of said simulator and of said pick-off means including means functioning at predetermined frequency to initiate operation of the simulator, means adjustable to indicate the desired value of an observed attitude at the future point in time and for indicating the discrepancy between the desired value and the experienced value, means responsive to the discrepancy indicating the change in settings of the controls calculated to eliminate the discrepancy, means responsive to the indication making the called for adjustments of the settings of the controls, and means incorporating in said simulator factors derived directly from said means responsive to the discrepancy and equivalent to factors that would ultimately be derived directly from the plant.

14. An apparatus for use in the control of a plant equipped with adjustable controls comprising, in combination, an analogue of the plant composed of electronic elements and adapted, when subject to the same forces and factors and when having incorporated therein the same values of attitude of the plant, to simulate the operation of the plant, in respect of at least one attitude, during a given program period, a sampling circuit electrically coupled with said analogue operable at a predetermined point in the program period of said analogue to pick off the value of the attitude being simulated, coordinating means governing the operation of said analogue and said sampling circuit including a first pulse generating circuit signaling the commencement and the end of the program period of said analogue and a second pulse generating circuit triggering the operation of said sampling circuit, means generating a periodically recurring system-forcing function exercising over-all control over said analogue and said coordinating means, a reference device adjustable to a value of said one attitude desired to be obtained, means electrically connected to said sampling circuit and said reference device operable to produce a signal indicative of the discrepancy between the desired value and an acceleratedly-experienced value, means responsive to said signal producing a signal indicative of the change in control settings that should be made to eliminate the discrepancy between the desired and the acceleratedly-experienced values, means for incorporating said last named signal in said analogue as factors equivalent to the actual factors that would be obtained from the plant upon adjustment of the controls as indicated by said last named signal, and means responsive to said last named signal adjusting the controls of the plant in accordance with the signal.

15. An apparatus for use in the control of a plant equipped with adjustable controls comprising, in combination, an analog plant with dynamic characteristics similar to said first named plant but operating on a time scale relatively fast as compared with said first named plant including means for iteratively sampling various parameters of said first named plant including one representing a variable attitude particularly to be controlled, a fast time regulator for controlling said analog plant, means for iteratively sampling the controlling action taken by said regulator, and means utilizing the data obtained by said last named sampling means to adjust the controls of said first named plant.

16. An apparatus for use in the control of a plant equipped with adjustable controls comprising, in combination, an analog plant with dynamic characteristics similar to said first named plant but operating on a time scale relatively fast as compared with said first named plant including means for iteratively sampling various parameters of said first named plant including one representing a variable attitude particularly to be controlled, a fast time regulator for controlling said analog plant, a reference device adjustable to the desired value of the particular attitude, means operable to determine the discrepancy between the desired value and the value experienced by said analog plant and through said regulator controlling said analog plant to reduce the discrepancy, means for iteratively sampling the corrective action taken by said regulator, and means utilizing the data obtained by said last named sampling means to adjust the controls of said first named plant.

References Cited in the file of this patent

UNITED STATES PATENTS

| | | |
|---|---|---|
| 1,343,198 | Eaton | June 15, 1920 |
| 2,163,873 | Gibbons | June 27, 1939 |
| 2,283,993 | Holtz et al. | May 26, 1942 |
| 2,294,165 | Elms | Aug. 25, 1942 |
| 2,450,772 | Watkins | Oct. 5, 1948 |
| 2,470,434 | Eckman et al. | May 17, 1949 |
| 2,503,213 | Philbrick | Apr. 4, 1950 |
| 2,519,615 | Wannamaker, Jr. | Aug. 22, 1950 |
| 2,557,954 | Durheim et al. | June 26, 1951 |

OTHER REFERENCES

"Electronic Computer Applications," article by D. Fidelman published in Radio and T. V. News, for March 1949, pages 3–6 of the Engineering Department.